United States Patent [19]

Murphy

[11] 4,119,592
[45] Oct. 10, 1978

[54] RUBBERY BLADDERS FROM EPOXY COMPOSITIONS

[75] Inventor: Walter Thomas Murphy, Cuyahoga Falls, Ohio

[73] Assignee: The B. F. Goodrich Company, Akron, Ohio

[21] Appl. No.: 772,047

[22] Filed: Feb. 25, 1977

[51] Int. Cl.$^2$ .................. C08G 59/42; C08G 81/42
[52] U.S. Cl. .................. 260/18 PF; 260/29.1 SB; 260/30.4 A; 260/30.4 EP; 260/31.8 E; 260/836; 260/837 R; 264/275; 264/311; 264/331; 273/65 B; 528/99; 528/97; 528/112; 528/94
[58] Field of Search ............ 260/836, 837 R, 47 EP, 260/47 EC, 30.4 A, 30.4 EP, 31.8 E, 29.1 SB, 18 PF, 78.41; 273/65 B

[56] References Cited
U.S. PATENT DOCUMENTS

| | | | |
|---|---|---|---|
| 3,673,274 | 6/1972 | Tomalia et al. | 260/836 |
| 3,686,359 | 8/1972 | Soldatos et al. | 260/836 |
| 4,016,022 | 4/1977 | Browning et al. | 156/285 |
| 4,025,578 | 5/1977 | Siebert | 260/837 R |
| 4,028,432 | 6/1977 | Dawans et al. | 260/836 |

OTHER PUBLICATIONS

Lee et al., "Handbook of Epoxy Resins", McGraw-Hill, 1967, pp. 10-17.

Primary Examiner—Harold D. Anderson
Assistant Examiner—E. A. Nielsen
Attorney, Agent, or Firm—J. A. Powell; J. H. Powell, Jr.

[57] ABSTRACT

Rubbery bladders are produced by rotational casting a liquid polymer composition containing (1) an epoxy resin, (2) a liquid carboxyl-terminated polymer, (3) an amine, (4) a dihydric compound, and (5) a plasticizer. In order to obtain the desired flex and tear properties, the equivalent ratio of the other reactants to epoxy must be from about 0.70 to about 1.15. The valve area of the bladder is reinforced with a spun bonded fabric.

23 Claims, No Drawings

RUBBERY BLADDERS FROM EPOXY COMPOSITIONS

BACKGROUND OF THE INVENTION

The production of hollow rubber bladders, such as those used to produce basketballs and the like, is currently a rather complex process. Rubber compounds, usually butyl rubber, are compounded at high energy consumption on a rubber mill or Banbury mixer. This compound is then calendered to the desired thickness in sheet form. From the rubber sheet, quarter sections of the bladder are die cut and pieced together by hand with adhesive and end patches. A valve is inserted and adhered into the construction. The total construction is then heat cured to produce a bladder. Because of the adhesive splices, which often form imperfect seals and poor weight balance, this conventional process often results in high amounts of defective bladders and excess scrap.

Rotocasting is a process now used to produce playballs from thermoplastic materials such as polyethylene powders and vinyl plastisols. Unfortunately, these materials do not have the resiliency and air retention of rubber and are not suitable for use in basketballs and the like.

SUMMARY OF THE INVENTION

Rubbery bladders are produced by rotocasting a liquid polymer composition containing (1) an epoxy resin having two epoxide groups per molecule; (2) a liquid carboxyl-terminated polymer having from about 1.4 to about 2.6 carboxyl groups per molecule; (3) an amine having selectivity for a carboxyl-epoxide reaction; (4) a dihydric compound; and (5) a plasticizer. In order to obtain the desired flex and tear properties, the equivalent ratio of components reactive with an epoxy group to epoxy must be from about 0.70 to about 1.15.

DETAILED DESCRIPTION

The composition is first prepared as two storage stable components with the first component containing the liquid polymer, amine and plasticizer. The second component contains the epoxy and the dihydric compound. The two components are mixed together at a temperature of from about 50° C. to about 100° C. to form the rotocastable composition. A valve along with a spun bonded fabric to reinforce the valve area are placed on a pin in the bladder mold prior to charging the mold with the rotocastable composition. Rotocasting is carried out at a temperature of from about 110° C. to about 180° C. until the composition is cured.

The liquid carboxyl-containing polymers have an average of from about 1.4 to about 2.6 carboxyl (—COOH) groups per polymer molecule, and more preferably from about an average of 1.8 to 2.2 carboxyl groups per molecule. At least one of the carboxyl groups is located at an end of the polymer molecule, preferably both so that the polymer is difunctional. The difunctional polymer molecule then is identified as a liquid carboxyl-terminated polymer. The polymers have a carboxyl content of about 1.6 to about 3.4 percent based upon the weight of the polymer. More preferably, the carboxyl content is from about 2.4 to about 2.8 percent by weight. The carboxyl content can be determined by titration of a polymer solution to a phenolphthalein end point using alcoholic KOH.

The liquid carboxyl-containing polymers have a molecular weight of from about 1,000 to about 8,000 as measured using a Mechrolab Vapor Pressure Osmometer. The polymers are more conveniently described by their bulk viscosity. The polymers have a bulk viscosity of from about 10,000 centipoises to about 600,000 centipoises (measured at 27° C. using a Brookfield Model LVT Viscometer with spindle No. 7 at 0.5 to 100 rpm) and more preferably from about 30,000 to about 200,000 centipoises.

The carboxyl-containing polymers have polymeric backbones comprising carbon-carbon linkages. The polymers are elastomers in a cured state. Polymers having carbon-carbon linkages contain polymerized units of a vinylidene monomer(s) selected from (a) monoolefins containing 2 to 14 carbon atoms such as ethylene, propylene, isobutylene, 1-butene, 1-pentene, 1-hexene, 1-dodecane and the like; (b) dienes containing 4 to about 10 carbon atoms such as butadiene, isoprene, 2-isopropyl-1,3-butadiene, chloroprene, and the like; (c) vinyl and allyl esters such as vinyl acetate, vinyl propionate, allyl acetate, and the like; (d) vinyl and allyl ethers such as vinyl methyl ether, allyl methyl ether, and the like; and (e) acrylates of the formula

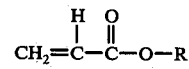

wherein R is an alkyl radical containing 1 to 18 carbon atoms or an alkoxy alkyl, an alkylthioalkyl, or cyanoalkyl radical containing 2 to 12 carbon atoms. Examples of such acrylates are ethyl acrylate, butyl acrylate, hexyl acrylate, 2-ethylhexyl acrylate, dodecyl acrylate, octadecyl acrylate, methoxyethyl acrylate, butoxyethyl acrylate, hexylthioethyl acrylate, β-cyanoethyl acrylate, cyanooctyl acrylate, and the like. Often two or more types of these polymerized monomeric units are contained in the polymeric backbone.

The vinylidene monomers listed above are readily polymerized in major amounts with minor amounts of (f) vinyl aromatics such as styrene α-methyl styrene, vinyl toluene, and the like; (g) vinyl nitriles such as acrylonitrile, methacrylonitrile, and the like; (h) methacrylates and ethacrylates such as methyl methacrylate, ethyl methacrylate, octyl methacrylate, ethyl ethacrylate, and the like; and (i) divinyls and diacrylates such as divinyl benzene, divinyl ether, diethylene glycol diacrylate, and the like. Liquid carboxyl-containing polymers comprised of a vinylidene monomer(s) listed in (a) to (e) with a minor amount of a vinylidene monomer(s) listed in (f) to (i) are within the scope of this invention.

The preferred liquid carboxyl-containing polymers are carboxyl-terminated polymers. Examples of liquid carboxyl-terminated polymers are carboxyl-terminated polyethylene, carboxyl-terminated polybutadiene, carboxyl-terminated polyisoprene, carboxyl-terminated poly(butadieneacrylonitrile), carboxyl-terminated poly(butadiene-styrene), carboxyl-terminated poly(butadiene-acrylonitrile-acrylic acid), carboxyl-terminated poly(ethyl acrylate), carboxyl-terminated poly(ethyl acrylate-n-butyl acrylate), carboxyl-terminated poly(n-butyl acrylate-acrylonitrile), carboxyl-terminated poly(butyl acrylate-styrene), and the like. The polymers can be prepared by free-radical polymerization using carboxyl-containing initiators and/or modifiers as disclosed in U.S. Pat. No. 3,285,949, and by solution polymerization using lithium metal or organometallic compounds and post-treating the polymers to form carboxyl groups as disclosed in U.S. Pat. Nos. 3,135,716 and 3,431,235. Carboxyl-terminated poly(butadiene-acrylonitrile) polymers were found to be especially useful. These polymers contain about 5% to about 40% by weight of acrylonitrile, about 1.6% to about 3.4% by weight of carboxyl, and about 58% to about 93% by weight of butadiene based upon the weight of the polymer. Liquid carboxyl-terminated poly(butadiene-acrylonitrile) polymers containing from about 8% to about 20% by weight of acrylonitrile have been found to be excellent polymers for rotocasting rubber bladders.

The level of liquid carboxyl-terminated polymer used is from about 80 to about 180 parts by weight per 100 parts by weight of epoxy. Preferably, the level is from about 100 to about 130 parts by weight per 100 parts by weight of epoxy resin.

The epoxy resin must have an average number of epoxide

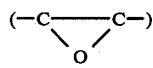

groups per molecule of from about 1.7 to about 2.3. An epoxy resin having substantially above or below this range of epoxide groups per molecule will not function to prepare the unique rubbery bladders of this invention. It is believed that epoxy resins having substantially below an average of 1.7 epoxide groups per molecule do not undergo chain-extension and/or crosslinking sufficiently enough, and epoxy resins having substantially above 2.3 epoxide groups per molecule undergo too much crosslinking to prepare the unique rubbery bladders.

The epoxy resins are liquids having a bulk viscosity (measured using a Brookfield LVT Viscometer, spindle No. 7, at 0.5 to 100 rpm, at 25° C.) of from about 200 centipoises to about 1,000,000 centipoises, and more preferredly from about 500 centipoises to about 300,000 centipoises. The epoxy resins can have epoxide equivalent weights of from about 150 to about 1,000. More preferredly, the resins have epoxide equivalent weights of from about 160 to about 400. The epoxide equivalent weight is the weight of epoxy resins that contains one gram equivalent of epoxy groups. The epoxide equivalent weight can be determined by using the pyridium chloride-pyridine method of determining epoxy content.

Many types of epoxy resins can be used. Examples of types are the diglycidyl ethers of dihydric phenols, the diglycidyl ethers of dihydric aliphatic alcohols, the diglycidyl ethers of cyclo dihydric aliphatic alcohols, the diglycidyl esters of dicarboxylic acids, the diamine compounds substituted by glycidyl radicals, and diepoxidized fatty acids. Examples of each of these types of epoxy resins are disclosed in U.S. Pat. Nos. 3,655,818 and 3,678,131. The epoxy resins can be halogenated.

The diglycidyl ethers of dihydric phenols and the diglycidyl ethers of dihydric aliphatic alcohols are the more preferred epoxy resins. An example of the diglycidyl ethers of dihydric phenols are the Bisphenol A/epichlorohydrin type resins such as the "EPON" resins marketed by Shell Chemical and the "D.E.R." resins marketed by Dow Chemical. An example of the diglycidyl ethers of dialiphatic alcohols are the ethylene glycol/epichlorohydrin type resins marketed by Dow Chemical as the "D.E.R." 700 Series resins. Properties of these two more preferred types of epoxy resins are given in the bulletin, *Dow Epoxy Resins,* 170-140C-5M-267. As mentioned above, although the epoxy resins used can have an average epoxide content from 1.7 to 2.3 epoxide groups per molecule, the most preferred epoxy resins have an average of about 2 epoxide groups per molecule.

The amine used is 2-ethyl-4-methylimidazole. The level of amine used is from about 1 to about 5 parts and more preferably, from about 1.5 to about 3 parts by weight per 100 parts by weight of epoxy resin.

The dihydric compound used is a dihydric aromatic compound. Examples of dihydric aromatic compounds are catechol, resorcinol, hydroxybenzyl alcohols, bis benzylic alcohol, dihydroxy-naphthalenes, and the like, and bisphenols of the formula

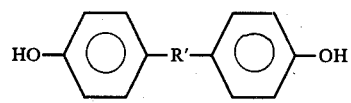

where R' is an alkylene group containing 1 to 12 carbon atoms or a bivalent radical containing 1 to 8 carbon atoms of C, O, S, and/or N. Examples of the bisphenols are methylene bisphenol, butylidene bisphenol, octylidene bisphenol, isopropylidene bisphenol, bisphenol sulfide, bisphenol sulfone, bisphenol ether, bisphenol amine, and the like.

The level of dihydric compound used is from about 30 to about 70 parts by weight per 100 parts by weight of epoxy resin. The preferred level is from about 40 to about 60 parts by weight per 100 parts by weight of epoxy resin.

Plasticizers used are those well known in the art. Suitable plasticizers are petroleum oils, castor oil, glycerin, silicones, aromatic and paraffinic oils, and the like; and esters such as alkyl and aromatic phthalates, sebacates, trimellitates, and the like; and monoepoxides such as octyl epoxytallate, epoxidized soybean oil and the like. Preferred plasticizers are di-2-ethylhexyl azelate, 2,2,4-trimethyl-1,3-pentanediol, diisobutyrate and an aromatic pretroleum distillate having a boiling point of 275° C. and sold under the trade name of Kenplast G. The level of plasticizers used is from about 10 to about 130 parts by weight and preferably from about 20 to about 50 parts by weight per 100 parts by weight of epoxy resin. Plasticizers are used to lower the viscosity of the liquid polymer component and the resultant two-component mix and, therefore, the level used will depend on the selection of the polymer and other ingredients.

In order to obtain the desired flex and tear properties of the liquid polymer composition, the equivalent ratio of reactants to epoxy must be from about 0.70 to about 1.15 and preferably from about 0.90 to about 1.10. The reactants are those materials in the composition which react with the epoxy, i.e., the carboxyl groups of the liquid polymer, amine groups and the OH groups of the dihydric compound. The equivalent weight of the epoxy resin is determined by dividing the number of epoxide groups per molecule into the molecular weight of the epoxy resin. The equivalent weight of the liquid polymer is determined by dividing the number of carboxyl groups per molecule into the molecular weight of the polymer. The equivalent weight of the dihydric compound is determined by dividing the number of hydroxyl groups per molecule into the molecular weight of the dihydric compound. The equivalent weight of 2-ethyl-4-methylimidazole is determined by dividing its molecular weight by two. 2-ethyl-4-methylimidazole is shown to be difunctional by Farkas and Strohm, *Journal of Applied Polymer Science*, Vol. 12, pp. 159-168 (1968). To determine the equivalent ratio, divide the number of equivalents of epoxy used into the sum of equivalents used of the liquid polymer, amine and dihydric compound.

In addition to the essential ingredients, i.e., the epoxy resin, the liquid polymer, the dihydric compound, amine and plasticizer, the liquid polymer composition can contain a broad range of compounding ingredients. These ingredients are typical ingredients used in rubber and/or epoxy compounding. Standard levels of these ingredients are employed, such levels being well known in the art. The only limitation placed on the levels of compounding ingredients used is that the liquid polymer composition containing these ingredients must be castable at temperatures ranging from about 50° C. to about 100° C. The amount of ingredients must be limited so that the viscosity of the liquid polymer composition is less than about 2500 centipoises measured at 75° C. This limitation is needed in order to allow the composition to be rotocast. This relatively low viscosity is required to rotocast articles with thin walls of 50 mils or less.

Examples of compounding ingredients are carbon black, metal carbonates and silicates, colorants, metal oxides, antioxidants, and stabilizers.

The essential ingredients, i.e., the liquid polymer, the epoxy, the amine, the dihydric compound, and the plasticizer are first prepared as two storage stable liquid components. The first component contains the liquid polymer, the amine, and the plasticizer. The second component contains the epoxy and the dihydric compound. Each component is first mixed separately using mixing kettles, Henschel mixers, ink mills and the like, employing standard mixing procedures and techniques. Heating of the materials is helpful to obtain dissolution and uniform dispersion of the materials. The two components are mixed together and maintained at a temperature of from about 50° C. to about 100° C. The viscosity of the composition must be less than about 2500 centipoises at 75° C. in order to be rotocast to thin walls of 50 mils or less. A pneumatic valve housing is placed on a pin in the rotocast mold. The liquid polymer composition is then poured or injected into the rotocast mold. The mold is heated while rotated to a temperature of from about 110° C. to about 180° C., preferably from about 150° C. to about 170° C. Once the composition is in the rotocast mold, the viscosity of the composition should remain substantially unchanged for about 3 to 7 minutes in order to allow the material to paint the walls of the mold so as to produce a uniform product. As is typical of a rotational molding process, the mold is rotated about two axes simultaneously. The ratio of speeds about the major and minor axis is chosen to match the shape of the mold. The heated mold is rotated for a time sufficient to cure the composition, which is from about 10' to about 40'. The curing time is dependent upon the mold temperature and the selection of ingredients. Once the composition has been cured, the mold is cooled and the cured bladder is removed from the mold. A check valve assembly is then inserted into the valve housing.

In order to prevent tearing of the cured bladders upon insertion of the valve assembly into the valve housing, it is preferred to reinforce the valve area of the bladder with a spun bonded fabric. The size of the fabric used should be at least slightly larger in diameter than the valve housing, and preferably about 1.5 to 2 times the diameter of the valve housing. In a basketball bladder, a 3.5 inch diameter disk of spun bonded fabric was found to be useful. The spun bonded fabric is centered on a pin in the mold and the valve housing is placed thereafter on the same pin in the mold before injecting the polymer composition. During the rotocasting process, the composition impregnates and encapsulates the spun bonded fabric to form a reinforcement in the valve area. Particularly useful spun bonded fabrics are spun bonded polyester fibers sold by DuPont as Reemay and nylon spun bonded fibers sold by Monsanto as Cerex.

The following examples are presented to more fully describe the invention.

EXAMPLES

General Mixing Procedure

The materials in the first component, i.e., the liquid polymer, the amine, and the plasticizer are placed into a mixing kettle. A vacuum is employed while stirring to remove entrapped air. The temperature of mixing is about 75° C. The materials are mixed until they are uniform, about 10 to 15 minutes. The materials in the second component, i.e., the epoxy and the dihydric compound are placed in a second mixing kettle. A vacuum is employed while stirring to remove entrapped air. Temperature of mixing the second component is about 100° C. The materials are mixed until they are uniform, about 20 to 40 minutes. The first and second components are then mixed together at a temperature of 75° C. for about 2 to 4 minutes. A vacuum is used while stirring to remove entrapped air. The viscosity of the total mixture at this point must be less than 2500 centipoises at 75° C. to obtain a 50 mil or less wall thickness. The total mixture is than placed in the rotocast mold and the mold is heated and rotated until the liquid polymer is cured. The mold is then cooled and the cured bladder is removed from the mold.

EXAMPLE I

This example is presented to show the change in flex and tear properties of the liquid rubber composition with various reactant/epoxy equivalent ratios. A liquid carboxyl-terminated poly(butadiene-acrylonitrile) rubber is mixed with a plasticizer and an amine to provide the first component. The rubber, identified as CTBN, has an acrylonitrile content of 10% by weight and a carboxyl content of 2.47% by weight, both weights based upon the total weight of the polymer, and having a bulk viscosity at 27° C. of 50,000 and a molecular weight of about 3,500. The polymer has an equivalent weight of about 1724. The plasticizer is an aromatic petroleum distillate having a boiling point of 275° C. and sold under the trade name of Kenplast G. The amine is 2-ethyl-4-methylimidazol and has an equivalent weight of 55. The first component is mixed at 75° C. following the general mixing procedure. An epoxy is mixed with a dihydric compound to provide the second component. The epoxy, identified as Epon 828, which is a bisphenol A-epichlorohydrin type resin having two terminal epoxide groups, an equivalent weight of about 190, and a bulk viscosity at 25° C. of about 12,000 centipoises. The dihydric compound, identified as BPA, is p,p'-isopropylidene bisphenol and has an equivalent weight of 114. The second component is mixed at 100° C. following the general mixing procedure. The two components are mixed at a temperature of 75° C. for about 2 to 4 minutes. A vacuum is used while stirring to remove entrapped air. The samples are cast into test specimen molds and the molds heated for 30 minutes at 160° C. to cure the samples. Table I lists the compositions, reactant/epoxy equivalent ratio, and the test results of each composition.

TABLE I

| INGREDIENT - PARTS BY WEIGHT | A | B | C | D | E |
|---|---|---|---|---|---|
| CTBN | 120 | 120 | 128 | 145 | 163 |
| Kenplast G | 30 | 30 | 32 | 36 | 41 |
| 2-ethyl-4-methylimidazol | 2 | 2 | 2.2 | 2.33 | 2.5 |
| EPON 828 | 100 | 100 | 100 | 100 | 100 |
| BPA | 24 | 40 | 50 | 50 | 50 |
| Reactant/epoxy equivalent ratio | 0.60 | 0.87 | 1.05 | 1.07 | 1.10 |
| TEST RESULTS | | | | | |
| Tensile (psi) | 2410 | 2455 | 1160 | 1060 | 875 |
| 100% modulus (psi) | 1370 | 1040 | 400 | 30 | 205 |
| Percent Elongation | 145 | 170 | 260 | 355 | 460 |
| Shore A hardness | 76 | 74 | 72 | 69 | 65 |
| Tear die c lbs./inc. | 75 | 99 | 107 | 138 | 137 |
| de Mattia flex-no. of flex at failure × 1000 | 0.5 | 6.2 | 25 | 60 | 610 |

This example shows that when the reactant/epoxy equivalent ratio is increased as in Samples B, C, D, and E, the tear strength of the composition is greatly increased. The resistance to flex fatigue of Samples B, C, D, and E with the higher equivalent ratio is dramatically improved as compared to Sample A with the lower equivalent ratio.

EXAMPLE II

A basketball bladder is produced as follows: The composition of Sample D in Example I is prepared according to the general mixing procedure. After placing a pneumatic valve housing on a pin in the rotocast mold, 170 grams of the two-component mixture, having a viscosity of 1700 centipoises at 75° C., is poured into the mold. The mold is heated and rotated at a 4:1 ratio for 20 minutes at 160° C. The mold is cooled to about 40° C., and the cured basketball bladder is removed from the mold. A check valve assembly is inserted into the valve housing to complete the bladder process. The bladder produced is suitable for further processing into a basketball which would normally involve filament winding a fabric onto the bladder and then applying a suitable cover to produce the final product.

EXAMPLE III

A basketball bladder is made as in Example II, except prior to placing the pneumatic valve housing onto the pin in the rotocast mold, a 3.5 inch diameter disk of spun bonded polyester fiber, identified as DuPont Reemay Style 2033, is centered on the pin in the mold. During rotocasting the liquid polymer composition impregnates the the fabric and forms a reinforcement in the valve housing area. The reinforcement in the valve area is especially useful because as the check valve assembly is inserted into the valve housing there is a likelihood of tearing the bladder in the valve area. A bladder produced with the spun bonded fabric in the valve area is greatly improved for tear in the valve area.

Rubbery bladders produced by this invention have many uses, such as to produce basketballs and other sport balls. The novel rubbery compositions of this invention possess good tear strength and excellent resistance to flex fatigue.

I claim:
1. A liquid polymer composition comprising:
   a. a liquid carboxyl-terminated polymer containing polymerized units of a vinylidene monomer, siad polymer having from about 1.4 to about 2.6 carboxyl groups per molecule,
   b. an epoxy resin having an average number of

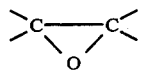

epoxide groups per molecule of from about 1.7 to about 2.3,
   c. a plasticizer,
   d. a dihydric compound selected from the group consisting of catechol, resorcinol, hydroxybenzyl alcohol, bis benzylic alcohol, dihydroxy napthalene and bisphenols of the formula

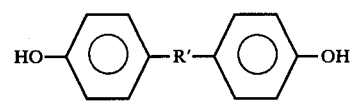

where R' is selected from the group consisting of an alkylene group containing 1 to 12 carbon atoms and a bivalent radical containing 1 to 8 atoms of C, O, S, and/or N, and
   e. 2-ethyl-4-methylimidazole; wherein the equivalent ratio of the sum of reactants a, d, and e, to epoxy is from about 0.70 to about 1.15.

2. A composition of claim 1 having a viscosity less than 2500 centipoises measured at 75° C.

3. A composition of claim 2 wherein the liquid carboxyl-terminated polymer has an average of about 1.8 to about 2.2 carboxyl groups per molecule, has a bulk viscosity of from about 10,000 centipoises to about 600,000 centipoises, and has a polymeric backbone consisting of carbon-carbon linkages derived from polymerized units of a monomer(s) selected from the group consisting of (a) monoolefins containing 2 to about 14 carbon atoms; (b) dienes containing 4 to about 10 carbon atoms; (c) vinyl and allyl esters; (d) vinyl and allyl ethers, and (e) acrylates of the formula

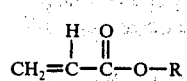

where R is selected from the group consisting of alkyl radicals containing 1 to about 18 carbon atoms, an alkoxyalkyl radical, an alkylthioalkyl radical, and a cyanoalkyl radical each containing 2 to about 12 carbon atoms, and optionally, a major amount of a monomer (a) to (e) with a minor amount of a monomer selected from the group consisting of (f) vinyl aromatics, (g) vinyl nitriles, (h) methacrylates and ethacrylates, and (i) divinyls and diacrylates.

4. A composition of claim 3 wherein the epoxy resin is selected from the group consisting of diglycidyl ethers of dihydric phenols and diglycidyl ethers of dihydric aliphatic alcohols, and has a bulk viscosity of from about 200 centipoises to about 1,000,000 centipoises, an epoxide equivalent weight of from about 150 to about 1,000, and an average of about 2 epoxide groups per molecule.

5. A composition of claim 4 wherein the dihydric compound is selected from the group consisting of catechol, resorcinol, hydroxybenzyl alcohol, bisbenzylic alcohol, dihydroxy naphthalene, methylene bisphenol, butylidene bisphenol, octylidene bisphenol, isopropylidene bisphenol, bisphenol sulfide, bisphenol sulfone, bisphenol ether, and bisphenol amine.

6. A composition of claim 5 wherein the liquid carboxyl-terminated polymer has an average of about 1.8 to about 2.2 carboxyl groups per molecule, has a bulk viscosity of from about 30,000 centipoises to about 200,000 centipoises, and is comprised of about 5 percent to about 40 percent by weight of acrylonitrile, about 1.6 percent to about 3.4 percent by weight of carboxyl, and about 58 percent to about 93 percent by weight of butadiene, all weights based upon the total weight of the polymer.

7. A composition of claim 6 comprising:
  a. 100 parts by weight of epoxy resin,
  b. from about 80 parts by weight to about 180 parts by weight of liquid carboxyl-terminated polymer per 100 parts by weight of epoxy resin,
  c. from about 10 parts by weight to about 130 parts by weight of plasticizer per 100 parts by weight of epoxy resin,
  d. from about 30 parts by weight to about 70 parts by weight of dihydric compound per 100 parts by weight of epoxy resin,
  e. from about 1 part by weight to about 5 parts by weight of 2-ethyl-4-methylimidazole per 100 parts by weight of epoxy resin.

8. A composition of claim 7 wherein the amount of plasticizer is from about 20 to about 50 parts by weight per 100 parts by weight of epoxy resin.

9. A composition of claim 8 wherein the amount of dihydric compound is from about 40 to about 60 parts by weight per 100 parts by weight of epoxy resin.

10. A composition of claim 9 wherein the amount of 2-ethyl-4-methylimidazole is from about 1.5 to about 3 parts by weight per 100 parts by weight of epoxy resin.

11. A composition of claim 10 wherein the dihydric compound is isopropylidene bisphenol.

12. A composition of claim 11 wherein the epoxy resin has an equivalent weight of from about 180 to about 200.

13. A rubber bladder comprising:

a. a liquid carboxyl-terminated polymer containing polymerized units of a vinylidene monomer, said polymer having from about 1.4 to about 2.6 carboxyl groups per molecule,
  b. an epoxy resin having an average number of

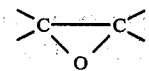

epoxide groups per molecule of from about 1.7 to about 2.3,
  c. plasticizer,
  d. a dihydric compound selected from the group consisting of catechol, resorcinol, hydroxybenzyl alcohol, bis benzylic alcohol, dihydroxy naphthalene and bisphenols of the formula

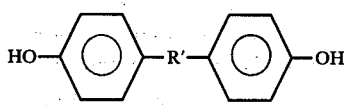

where R' is selected from the group consisting of an alkylene group containing 1 to 12 carbon atoms and a bivalent radical containing 1 to 8 atoms of C, O, S, and/or N, and
  e. 2-ethyl-4-methylimidazole; wherein the equivalent ratio of the sum of reactants a, d, and e, to epoxy is from about 0.70 to about 1.15.

14. A bladder of claim 13 wherein the liquid carboxyl-terminated polymer has an average of about 1.8 to about 2.2 carboxyl groups per molecule, has a bulk viscosity of from about 10,000 centipoises to about 600,000 centipoises, and has a polymeric backbone consisting of carbon-carbon linkages derived from polymerized units of a monomer(s) selected from the group consisting of (a) monoolefins containing 2 to about 14 carbon atoms; (b) dienes containing 4 to about 10 carbon atoms; (c) vinyl and allyl esters; (d) vinyl and allyl ethers and (e) acrylates of the formula

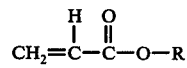

where R is selected from the group consisting of alkyl radicals containing 1 to about 18 carbon atoms, an alkoxyalkyl radical, an alkylthioalkyl radical, and a cyanoalkyl radical each containing 2 to about 12 carbon atoms, and optionally, a major amount of a monomer (a) to (e) with a minor amount of a monomer selected from the group consisting of (f) vinyl aromatics, (g) vinyl nitriles, (h) methacrylates and ethacrylates, and (i) divinyls and diacrylates.

15. A bladder of claim 14 wherein the epoxy resin is selected from the group consisting of diglycidyl ethers of dihydric phenols and diglycidyl ethers of dihydric aliphatic alcohols, and has a bulk viscosity of from about 200 centipoises to about 1,000,000 centipoises, an epoxide equivalent weight of from about 150 to about 1,000, and an average of about 2 epoxide groups per molecule.

16. A bladder of claim 15 wherein the dihydric compound is selected from the group consisting of catechol, resorcinol, hydroxybenzyl alcohol, bisbenzylic alcohol, dihydroxy naphthalene, methylene bisphenol, butylidene bisphenol, octylidene bisphenol, isopropylidene bisphenol, bisphenol sulfide, bisphenol sulfone, bisphenol ether, and bisphenol amine.

17. A bladder of claim 16 wherein the liquid carboxyl-terminated polymer has an average of about 1.8 to about 2.2 carboxyl groups per molecule, has a bulk viscosity of from about 30,000 centipoises to about 200,000 centipoises and is comprised of about 5 percent to about 40 percent by weight of acrylonitrile, about 1.6 percent to about 3.4 percent by weight of carboxyl, and about 58 percent to about 93 percent by weight of butadiene, all weights based upon the total weight of the polymer.

18. A bladder of claim 17 comprising:
 a. 100 parts by weight of epoxy resin,
 b. from about 80 parts by weight to about 180 parts by weight of liquid carboxyl-terminated polymer per 100 parts by weight of epoxy resin,
 c. from about 10 parts by weight to about 130 parts by weight of plasticizer per 100 parts by weight of epoxy resin,
 d. from about 30 parts by weight to about 70 parts by weight of dihydric compound per 100 parts by weight of epoxy resin,
 e. from about 1 part by weight to about 5 parts by weight of 2-ethyl-4-methylimidazole per 100 parts by weight of epoxy resin.

19. A bladder of claim 18 wherein the amount of plasticizer if from about 20 to about 50 parts by weight per 100 parts by weight of epoxy resin.

20. A bladder of claim 19 wherein the amount of dihydric compound is from about 40 to about 60 parts by weight per 100 parts b weight of epoxy resin.

21. A bladder of claim 20 wherein the amount of 2-ethyl-4-methylimidazole is from about 1.5 to about 3 parts by weight per 100 parts by weight of epoxy resin.

22. A bladder of claim 21 wherein the dihydric compound is isopropylidene bisphenol.

23. A bladder of claim 22 wherein the epoxy resin has an equivalent weight of from about 180 to about 200.

* * * * *